United States Patent [19]

Iwatani et al.

[11] Patent Number: 5,686,819
[45] Date of Patent: Nov. 11, 1997

[54] CONTROL APPARATUS FOR AC GENERATOR OF MOTOR VEHICLE

[75] Inventors: Shiro Iwatani; Kyoji Matsumura, both of Tokyo, Japan

[73] Assignee: Mitsubishi Denki Kabushiki Kaisha, Tokyo, Japan

[21] Appl. No.: 569,429

[22] Filed: Dec. 8, 1995

[30] Foreign Application Priority Data

Jan. 25, 1995 [JP] Japan .................................. 7-010020

[51] Int. Cl.[6] ........................................ H02P 9/10
[52] U.S. Cl. .................................. 322/25; 322/28
[58] Field of Search .......................... 322/25, 26, 28

[56] References Cited

U.S. PATENT DOCUMENTS

| | | | |
|---|---|---|---|
| 4,563,631 | 1/1986 | Mashino et al. | 322/33 |
| 4,651,081 | 3/1987 | Nishimura et al. | 320/64 |
| 4,694,238 | 9/1987 | Norton | 322/28 |
| 4,985,670 | 1/1991 | Kaneyuki et al. | 322/28 |
| 5,512,813 | 4/1996 | Uchinami | 322/28 |

FOREIGN PATENT DOCUMENTS 3302735  12/1988  Japan .

Primary Examiner—Steven L. Stephan
Assistant Examiner—Nicholas Ponomarenko
Attorney, Agent, or Firm—Sughrue, Mion, Zinn, Macpeak & Seas, PLLC

[57] ABSTRACT

A control apparatus for an AC generator of a motor vehicle of high reliability having substantially no adverse influence to an onboard battery and an onboard high-voltage load by suppressing to a passible minimum variation of a regulating voltage which may occur as contacts of a detection voltage change-over switch are degraded. An AC generator of a motor vehicle includes a rectifier circuit for rectifying an output of the AC generator including a field coil, an output change-over switch for changing over an output of the rectifier circuit to either one of a battery and a high-voltage electric load mounted on the motor vehicle, and a voltage regulator for regulating an exciting current supplied to the field coil in dependence on a terminal voltage of the battery as detected on a charging line connected to the battery by way of the output change-over switch upon charging of the battery from the output of the rectifier circuit, to thereby regulate the output voltage of the AC generator.

8 Claims, 5 Drawing Sheets

CONTROL APPARATUS FOR AC GENERATOR OF MOTOR VEHICLE

BACKGROUND OF THE INVENTION

1. Field of the Invention

The present invention generally relates to a control apparatus for an AC generator of a motor vehicle. More particularly, the invention is concerned with a control apparatus for an AC generator of a motor vehicle which is adapted to control switching or changing-over of the output of the AC generator of a motor vehicle from a battery for charging thereof to a high-voltage load such as a catalyst heating system, a defreezing system or the like which is designed to be driven with a high voltage for a short period.

2. Description of Related Art

In order to operate during a relatively short period a catalyst heating system for purifying an exhaust gas of an internal combustion engine immediately in succession to the start thereof or a defreezing system for removing within a short time the ice layers adhering to window panes of the motor vehicle in the coldest season, it is required to operate the system of concern with a high voltage falling within a range of 30 to 50 volts because the system constitutes a high-voltage load. However, it is impossible to supply such a high voltage to the system from an onboard battery of the motor vehicle. Under the circumstances, the output power of an AC generator for the motor vehicle is directly supplied to the system.

As a control apparatus for an AC generator of a motor vehicle known heretofore, there may be mentioned an apparatus disclosed in Japanese Unexamined Patent Application Publication No. 31212/1988 (JP-A-63-31212). FIG. 5 is a circuit diagram showing a structure of the control apparatus disclosed in the publication mentioned above. Referring to FIG. 5, an AC generator 1 driven by an internal combustion engine (not shown) is comprised of an armature coil 101 and a field coil 102. The electric power generated by the AC generator 1 undergoes a full-wave rectification by a rectifier circuit 2, as a result of which a DC voltage is generated across a terminal 201 of positive polarity (hereinafter referred to as the plus terminal) and a terminal 202 of negative polarity (hereinafter referred to as the minus terminal) which is connected to the ground potential.

A voltage regulator 3 serves for controlling an exciting current fed to the field coil 102 of the AC generator 1 in dependence on whether the output of the rectifier circuit 2 is to be changed over to a battery 4 or to an onboard high-voltage electric load 5 such as the exhaust gas heating system, defreezing system or the like of the motor vehicle to thereby regulate the AC output voltage of the AC generator 1 to a preset corresponding value.

A key switch 6 is closed upon starting of the engine. As a result of this, an initial exciting current is supplied to the field coil 102 of the AC generator from the battery 4 by way of an excitation line L3 led out from an output change-over controller 7 while a power supply source voltage is supplied to the voltage regulator 3 from the battery 4.

The voltage regulator 3 is constituted by a series circuit of voltage divider resistors 301 and 302 for dividing a plus terminal voltage of the battery 4 applied via a voltage detection line L1 led out from the output change-over controller 7 or the output voltage of the rectifier circuit 2, a Zener diode 303 having a cathode connected to a junction P1 between the voltage divider resistors 301 and 302 and a series connection of a base resistor 306 and a transistor 304 connected between the pulse terminal of the battery 4 via the excitation line L3 and the ground potential, wherein the anode of the Zener diode 303 is connected to a base of the transistor 304 so that the transistor 304 is turned on or off in response to the turn-on (conducting state) or turn-off (nonconducting state) of the Zener diode 303.

Further connected between the ground potential and the plus terminal of the battery 4 via the excitation line L3 is a series circuit of a surge absorbing diode 307 and an output transistor 305, wherein a base of the output transistor 305 is connected to a junction between a base resistor 306 and a corrector of the transistor 304 so that the output transistor 305 is turned on or off under the control of the transistor 304.

The field coil 102 is connected in parallel to a surge absorbing diode 307 via wiring conductors. Thus, the exciting current supplied to the field coil 102 from the battery 4 can flow through the field coil 102 and then to the ground by way of the output transistor 305.

The output change-over controller 7 is composed of an output change-over switch 71, an excitation switch 72 and a voltage detection change-over switch 73, wherein the contact change-over operation of the output change-over switch 71 is controlled by an excitation coil CL1. A common terminal C1 of the output change-over switch 71 is connected to the plus terminal 201 of the rectifier circuit 2, while a contact A1 of the output change-over switch 71 is connected to the onboard high-voltage electric load 5 with a contact B1 of the switch 71 being connected to the plus terminal of the battery 4. On the other hand, the excitation switch 72 includes a timer contact T which is opened about one second when an excitation coil CL2 is energized by way of the output change-over switch 71. The excitation switch 72 has one end connected to the plus terminal of the battery 4 via the key switch 6 and the other end connected to a positive or plus pole of the field coil 102 via the excitation line L3.

The voltage detection change-over switch 73 has a common terminal C2 which is connected to one end of the voltage divider resistor 301 via the voltage detection line L1, while a contact A2 of the switch 73 is connected to the common terminal C1 of the output change-over controller 7 by way of a high-voltage detecting resistor 731 with a contact B2 of the switch 73 being connected to the plus terminal of the battery 4. Thus, when the common terminal C2 of the voltage detection change-over switch 73 is closed to the contact A2, the high-voltage detecting resistor 731 is electrically inserted in series to the voltage divider resistors 301 and 302, resulting in that the output voltage of the rectifier circuit 2 is applied across the voltage divider resistors 301 and 302. On the other hand, when the common terminal C2 of the voltage detection change-over switch 73 is closed to the contact B2, the plus terminal voltage of the battery 4 is applied across the voltage divider resistors 301 and 302.

Next, operation of the known control apparatus shown in FIG. 5 will be described. In the battery charge operation mode for charging the battery 4, the common terminals C1 and C2 of the output change-over switch 71 and the voltage detection change-over switch 73 are closed to the contacts B1 and B2, respectively, whereby the plus terminal of the battery 4 is connected to the plus terminal 201 of the rectifier circuit 2 and the voltage divider resistor 301.

When the key switch 6 is closed upon starting of the engine of the motor vehicle, the excitation switch 72 is automatically closed. As a result of this, an exciting current flows to the field coil 102 of the AC generator 1 from the battery 4 by way of the key switch 6 and the excitation switch 72.

When the engine operation is started, the field coil 102 rotates relative to the armature coil 101, whereby an AC voltage is induced in the armature coil 101. The induced AC voltage is rectified by the rectifier circuit 2 and thus a DC voltage makes appearance between the plus terminal 201 and the minus terminal 202 of the rectifier circuit 2, as a result of which the battery 4 is charged by way of the output change-over switch 71.

There may arise such situation that the battery 4 is overcharged when the AC generator 1 continues to generate the output power after starting of the engine. To cope with such situation, the plus terminal voltage of the battery 4 is applied across the series circuit of the voltage divider resistors 301 and 302 by way of the voltage detection change-over switch 73. When the applied terminal voltage of the battery 4 increases beyond, for example, 14 volts, the divided voltage making appearance at the junction P1 between the voltage divider resistors 301 and 302 rises up to a voltage level which enables the Zener diode 303 to conduct. Thus, the Zener diode 303 assumes the conducting state.

Consequently, the transistor 304 is turned on to thereby lower the base potential of the output transistor 305 to the ground potential level, rendering the output transistor 305 to the non-conducting or off-state. Thus, the exciting current supplied to the field coil 102 from the battery 4 via the output transistor 305 is interrupted, which results in that the potential at the plus terminal 201 of the rectifier circuit 2 is lowered. In this manner, the terminal voltage of the battery 4 is so controlled as to assume a predetermined constant value without being overcharged.

By contrast, when the terminal voltage of the battery 4 becomes lower due to power supply to a load of the motor vehicle, the voltage appearing at the junction between the voltage divider resistors 301 and 302 becomes lower than a voltage for maintaining the Zener diode in the conducting state. Thus, the Zener diode 303 becomes nonconducting with the transistor 304 being turned off. In the mean while, a base current flows to the base of the output transistor 305 by way of the base resistor 306, whereby the output transistor 305 is turned on. As a result of this, the exciting current flows to the field coil 102 from the battery 4 via the output transistor 305 to thereby set the AC generator 1 to the power generation mode. The operation described above is repeated every time the terminal voltage of the battery 4 lowers, for regulating the terminal voltage of the battery 4 so that it assumes a predetermined level constantly.

Next, description will turn to a high-voltage load operation mode of the AC generator for actuating a catalyst heating system, a defrosting system or the like which is represented by the high-voltage load 5. Upon supplying the output of the rectifier circuit 2 to the onboard high-voltage electric load 5 by switching the output change-over switch 71 to the contact A1, the excitation switch 72 is turned off about one second under energization of the excitation coil CL2, whereby the exciting current flowing to the field coil 102 is attenuated. Thus, the output change-over switch 71 can be protected against damage or injury due to spark or similar unwanted phenomena which may take place in conjunction with the operation of the output change-over switch 71.

During a period in which the excitation switch 72 is in the off-state, the output change-over switch 71 is closed to the contact A1, whereby the plus terminal 201 of the rectifier circuit 2 is connected to the onboard high-voltage electric load 5. Furthermore, because the voltage detection change-over switch 73 is closed to the contact A2, the high-voltage detecting resistor 731 is electrically connected in series to the voltage divider resistor 301, which means that the high-voltage detecting resistor 731 and the voltage divider resistors 301 and 302 are connected in series between the plus terminal 201 of the rectifier circuit 2 and the ground potential.

After completion of the change-over operations of the output change-over switch 71 and the voltage detection change-over switch 73, the excitation switch 72 is restored to the closed state. At this juncture, it should be mentioned that the sequential control of the output change-over switch 71 and the voltage detection change-over switch 73 is automatically carried out by a control circuit (not shown) which is incorporated in the output change-over controller 7. Upon closing of the excitation switch 72, the exciting current flows to the field coil 102 of the AC generator 1 from the battery 4. Thus, the voltage of the electric power generated by the AC generator 1 increases as the engine rotation speed increases, causing the DC potential at the plus terminal 201 of the rectifier circuit 2 to increase correspondingly. Thus, the electric power generated by the AC generator 1 is supplied to the onboard high-voltage electric load 5 by way of the output change-over switch 71.

The output voltage of the rectifier circuit 2 is detected by the high-voltage detecting resistor 731 and the voltage divider resistors 301 and 302. In that case, when the value of the output voltage of the rectifier circuit 2 increases beyond, for example, 50 volts, the voltage appearing at the junction P1 between the voltage divider resistors 301 and 302 reaches the turn-on threshold value of the Zener diode 303 to thereby set it to the conducting state (on-state).

As a consequence, the transistor 304 is turned on to lower the potential applied to the base of the output transistor 305 to the ground potential, whereby the output transistor 305 is turned off. Thus, the exciting current supplied to the field coil 102 from the battery 4 via the output transistor 305 is interrupted. Due to the interruption of the exciting current, the potential at the plus terminal 201 of the rectifier circuit 2 is prevented from increasing beyond 50 volts and remains at a constant voltage level.

It is however noted that when the potential at the plus terminal 201 lowers below a predetermined value during the period in which the voltage is supplied to the onboard high-voltage electric load 5, the voltage appearing at the junction P1 between the voltage divider resistors 301 and 302 lowers to such a level that the Zener diode 303 and hence the transistor 304 become nonconductive. Consequently, a base current flows to the base of the output transistor 305 via the base resistor 306 to turn on the output transistor 305. Thus, the DC current can again flow to the field coil 102 from the battery 4 by way of the output transistor 305, whereupon the power generating operation of the AC generator 1 is started again.

By repeating the operation described above every time the potential of the plus terminal 201 of the rectifier circuit 2 becomes low, the high voltage of the power supplied to the onboard high-voltage electric load 5 is so controlled as to remain to be constant. As is apparent from the foregoing description, in the high-voltage load operation mode such as described above, the battery 4 can not be charged by the output power of the AC generator 1 but continues to supply the exciting current to the field coil 102. Thus, the battery 4 may ultimately assume the discharged state.

For preventing the battery 4 from the overdischarge such as mentioned above, the high-voltage load operation is limited to a short duration (on the order of several minutes). Further, when the terminal voltage of the battery 4 becomes lower than a predetermined value, the high-voltage load operation is stopped in order to resume the ordinary battery charge operation. These operations are effected under the control of a control circuit (not shown) which is incorporated in the output change-over controller 7.

However, the conventional output control apparatus for the AC generator of the motor vehicle of the structure described above suffers from problems mentioned below.

1) Because of the necessity of changing over the terminal voltage of the battery in the normal battery charge operation mode with the rectified output power in the high-voltage load operation mode, it is required to provide a voltage detection change-over switch, which means that the number of parts of the control apparatus increases to make the apparatus complicate and expensive.

2) When a mechanical switch having metal contacts is employed as the voltage detection change-over switch in view of the current capacity as required for the switch, the contact resistance increases because of deterioration of the contacts in the course of time lapse, incurring unavoidably a voltage drop across the contacts. When such voltage drop becomes high, it is necessary to apply an increased rectifier output or terminal voltage of the battery across the divider resistors in order to ensure a turn-on voltage of the Zener diode which will ultimately incur a corresponding increase in the regulating voltage and hence the power consumption in both the normal operation mode and the high-voltage load operation mode.

3) Besides, when the contact resistance mentioned above becomes infinite due to destruction of the voltage detection change-over switch, the voltage drop will become infinitely large, rendering it impossible to feed back the rectified output and the terminal voltage of the battery to the voltage regulator, which in turn makes impossible the output voltage control of the AC generator. As a result, the output voltage of the rectifier will rise up abnormally to thereby overcharge the battery, which may thus suffer a damage which can not be remedied.

SUMMARY OF THE INVENTION

In the light of the state of the art described above, it is an object of the present invention to provide a control apparatus for an AC generator of a motor vehicle in which the voltage detection change-over switch of an output change-over means can be spared and which allows the control apparatus to be implemented inexpensively.

Another object of the present invention is to provide a control apparatus for an AC generator which is capable of suppressing variation of the regulating voltage which is brought about by deterioration of switch contacts, to thereby protect the battery and the high-voltage load from damage and which can thus ensure a high reliability.

In view of the above and other objects which will become apparent as the description proceeds, there is provided according to a general aspect of the present invention a control apparatus for an AC generator of a motor vehicle, which apparatus includes a rectifier circuit for rectifying an output of the AC generator including a field coil, an output change-over means for changing over an output of the rectifier circuit to either one of a battery and a high-voltage load mounted on the motor vehicle, and a voltage regulating means for regulating an exciting current supplied to the field coil in dependence on a terminal voltage of the battery as detected on a charging line connected to the battery by way of the output change-over means upon charging of the battery from the output of the rectifier circuit, to thereby regulate the output voltage of the AC generator.

With the arrangement of the AC generator control apparatus for the motor vehicle described above, the exciting current fed to the field coil is controlled in dependence on the terminal voltage of the battery when the output power of the rectifier circuit is supplied to the battery to thereby regulate or adjust the output voltage of the AC generator so that the terminal voltage of the battery can be maintained at a constant level.

In a preferred mode for carrying out the invention, the control apparatus mentioned above may further includes a high-voltage control means for detecting a terminal voltage of the high-voltage load upon switching of the output change-over means to the high-voltage load to thereby output a drive signal for controlling operation of the voltage regulating means upon detection of abnormality of the terminal voltage.

With the structure of the motor vehicle AC generator control apparatus described above, the exciting current fed to the field coil can be controlled in dependence on the terminal voltage of the high-voltage load when the output change-over means is switched to the high-voltage load, to thereby regulate or adjust correspondingly the output voltage of the AC generator for controlling the voltage supplied to the high-voltage load so that it remains constant. Thus, the circuit configuration can be simplified because the terminal voltage detection of the high-voltage load can be effectuated by detecting the terminal voltage of the battery without need for changing over the voltage detection lines.

In another preferred mode for carrying out the invention, the high-voltage control means may be so implemented as to invalidate the detecting operation of the voltage regulator for detecting the terminal voltage of the battery upon switching of the output change-over means to the high-voltage load and output a drive signal for driving/controlling the voltage regulating means in dependence on the result of abnormality detection of the terminal voltage of the high-voltage load.

With the arrangement of the motor vehicle AC generator control apparatus described above, operation for detecting change of the terminal voltage of the battery is invalidated when the output change-over means is switched to the high-voltage load so that the output voltage of the AC generator can be adjusted or regulated by controlling the exciting current fed to the field coil in dependence on only the variation of the terminal voltage of the high-voltage load, whereby the provision of the individual voltage detection change-over means is rendered unnecessary. Thus, the abnormal voltage detection can easily be realized because the terminal voltage abnormality detection is realized simultaneously with the switching of the output change-over means to the high-voltage load from the battery.

In yet another preferred mode for carrying out the invention, the high-voltage control means may include an exciting current interrupting means for interrupting temporarily the supply of the exciting current to the field coil from the voltage regulator upon switching of the output change-over means to the high-voltage load.

By virtue of the arrangement of the control apparatus for the AC generator of a motor vehicle described above, the exciting current fed to the field coil from the battery is interrupted for several seconds upon switching of the output power of the rectifier circuit to the high-voltage load from the battery by the output change-over means, whereby the output change-over means can be protected against damage due to a spark which may otherwise take place.

In still another preferred mode for carrying out the invention, the high-voltage control means may include an abnormality alarming means for outputting an abnormality alarm signal in response to an abnormality detection signal indicating abnormality of the output of the AC generator.

With the arrangement of the control apparatus for the AC generator of the motor vehicle described above, the abnormality event that the output power of the AC generator becomes abnormally low can be informed to the driver by the alarm means provided in association with the high-voltage control means. Thus, the safety of the apparatus can be enhanced because the abnormality of the AC generator can be detected regardless of whether the control apparatus is in the battery charge operation mode or in the high-voltage load operation mode, to another advantage of the invention.

In a further preferred mode for carrying out the invention, the abnormality detection signal may be derived from an output voltage of the AC generator rectified by a rectifier circuit and outputted from an additional rectifier output terminal thereof.

With the structure of the AC generator control apparatus described above, abnormality of the output power of the AC generator can be informed by the alarm means to the driver, when the output voltage generated from the second rectifier output terminal becomes abnormally low. Thus, the abnormality detection of the AC generator can easily be carried out at the DC voltage level.

In a yet further preferred mode for carrying out the invention, the abnormality detection signal may be derived from a smoothed voltage generated by rectifying and smoothing one phase output voltage of the AC generator.

With the arrangement of the control apparatus for the AC generator of a motor vehicle, one phase voltage of the AC generator is outputted to the alarm means after rectification thereof, wherein abnormality of the AC generator output is messaged by the alarming means when the output voltage of the AC generator lowers abnormally. Thus, the abnormality detection can effectively be realized with high reliability because it is carried out straightforwardly on the output voltage of the AC generator.

In a still further preferred mode for carrying out the invention, the abnormality detection signal may be applied to an input terminal of the voltage regulator to which a drive signal is inputted through a connecting line extending from the high-voltage control means and at the same time applied to an abnormality alarming means by way of the same connecting line.

With the arrangement of the control apparatus described above, the abnormality alarm signal is applied to the input terminal of the voltage regulator receiving the drive signal from the high voltage control circuit via the connecting line or conductor, wherein the abnormality alarm signal of the alarm means incorporated in the high-voltage control circuit is supplied by way of the same connecting line. Thus, the wiring length of the abnormality detection line can be shortened to a possible minimum, whereby the influence of noise to the abnormality detection signal can be suppressed to thereby assure an improvement of the signal quality.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
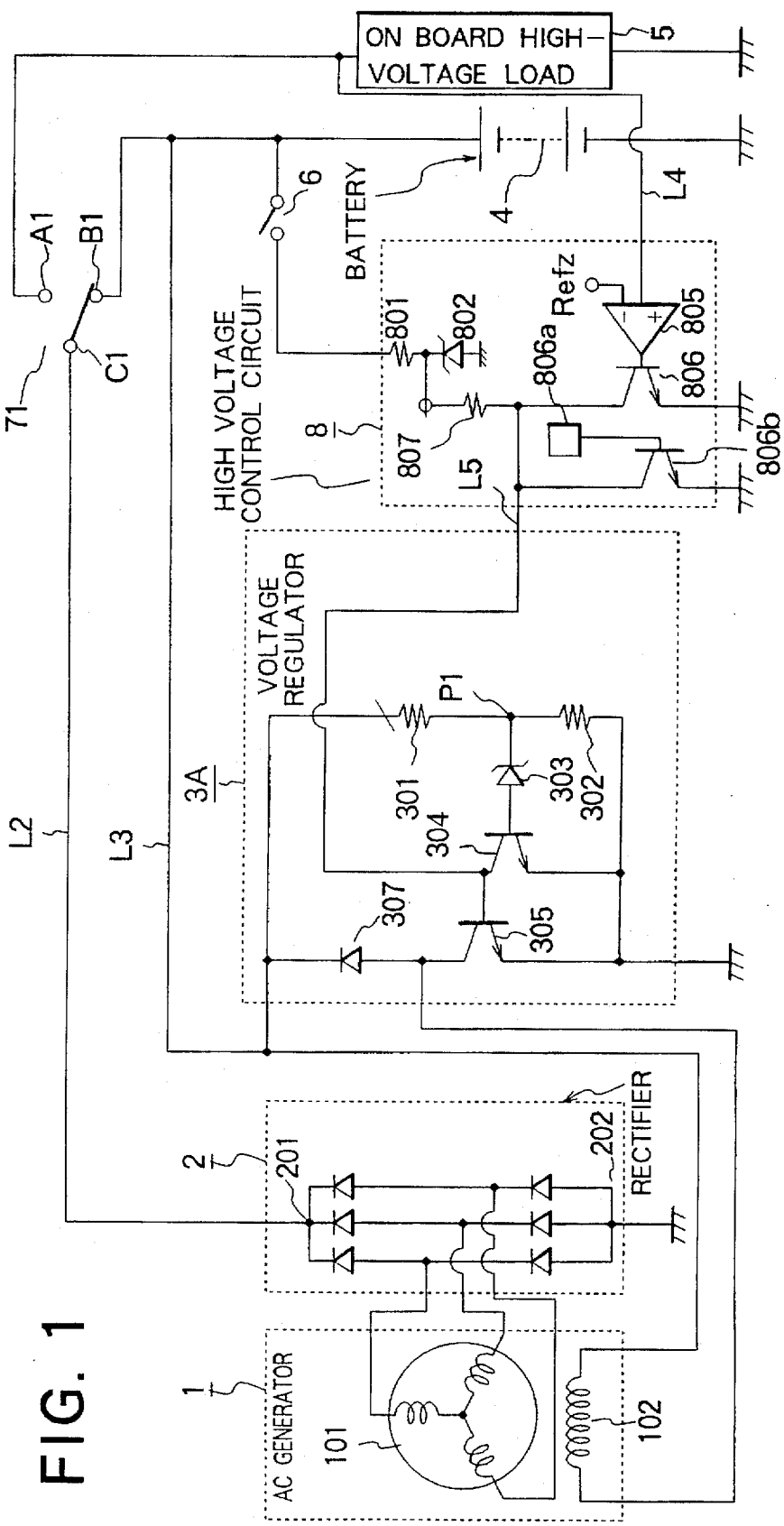
FIG. 1 shows a circuit configuration of a control apparatus for an AC generator of a motor vehicle according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

FIG. 1 shows a circuit configuration of a control apparatus for an AC generator of a motor vehicle according to a first embodiment of the present invention. In the figure, like reference characters as those used in FIG. 5 denote components like as or equivalent to those shown in FIG. 5. Referring to FIG. 1, in a voltage regulator 3A according to the instant embodiment of the invention, the plus end (i.e., end having a positive polarity) of a series circuit of the voltage divider resistors 301 and 302 is connected directly to the plus terminal of the battery 4 by the excitation line L3. Similarly, the end of plus polarity of the field coil 102 is connected directly to the plus terminal of the battery 4 via the excitation line L3.

Figure 5:
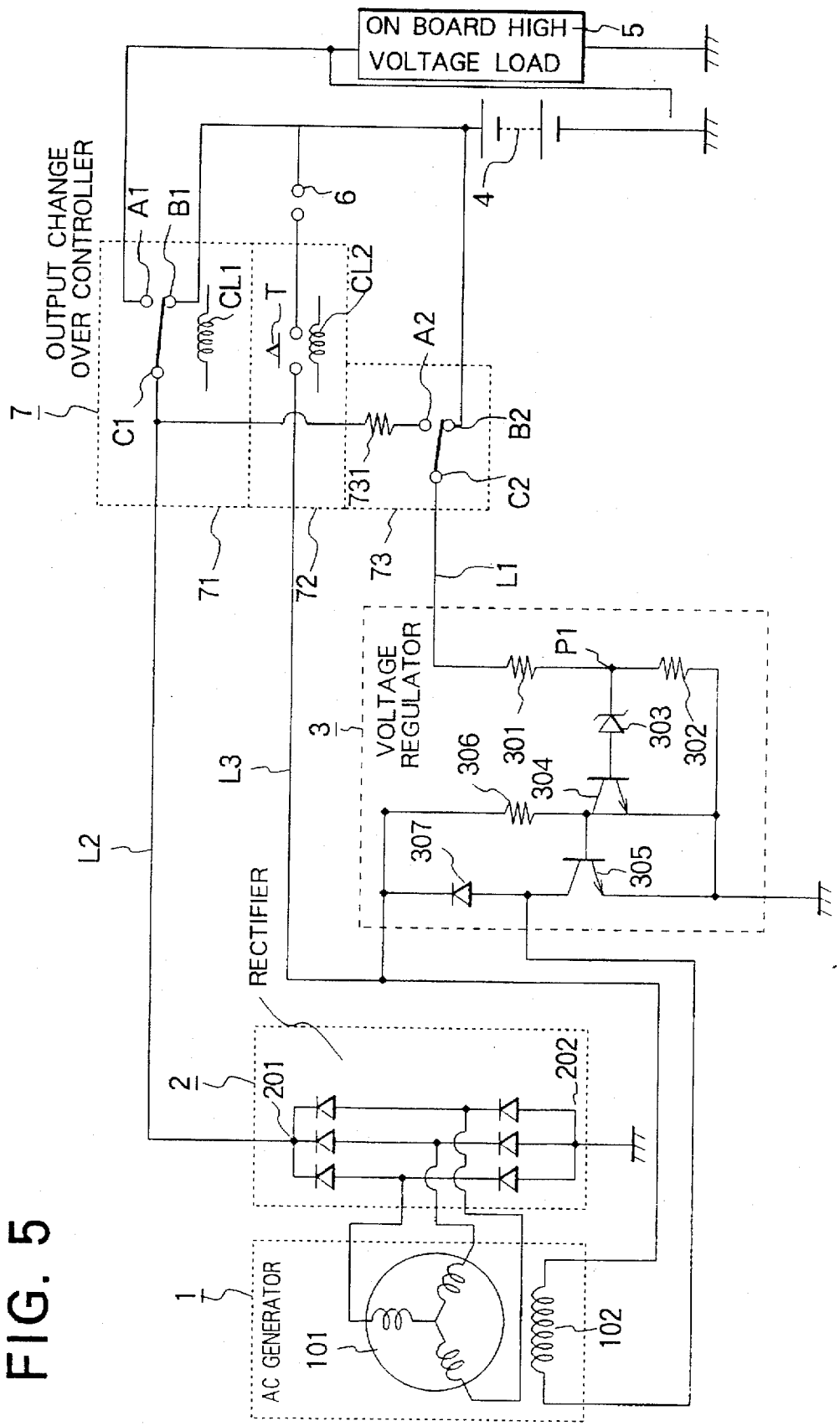
FIG. 5 is a circuit diagram showing a structure of the conventional control apparatus for an AC generator of a motor vehicle.

A high-voltage control circuit 8 is provided in place of the voltage detection change-over switch 73 employed in the conventional apparatus shown in FIG. 5. The high-voltage control circuit 8 is composed of a series circuit of a resistor 801 and a Zener diode 802 which cooperate to constitute a constant voltage source and to which a voltage of plus polarity is inputted from the battery 4 via the key switch 6, a comparator 805 having a plus input terminal to which a voltage generated across an onboard high-voltage electric load 5 is inputted via a high-voltage detection line L4 and a minus input terminal to which a reference voltage is inputted, and a transistor 806 having a base connected to an output terminal of the comparator 805 so that the transistor 806 is turned on in response to a high-level output of the comparator 805 and a collector to which connected is one end of a resistor 807 which serves to drive the output transistor 305. The other end of the resistor 807 is connected to a junction between the resistor 801 and the Zener diode 802 which cooperate to constitute a constant voltage source.

The collector of the transistor 806 is connected to the base of the output transistor 305 constituting a part of the voltage regulator 3A via a driving line L5. A one-shot multivibrator 806a is so implemented as to output a pulse signal having a pulse width or duration corresponding to about one second in response to switching of the output change-over switch 71 to the contact A1 from the contact B1. The output pulse signal of the one-shot multivibrator 806a is applied to a base of a transistor 806b which is turned on in response to the pulse signal and maintained in the conducting state (on state) during a period of about one second, whereby the driving line L5 is connected to the ground potential. Thus, the output transistor 305 is set to the nonconducting state (off state) about one second to thereby interrupt the exciting current.

At this juncture, it should be mentioned that the voltage regulator 3A is accommodated within a same unit together with the AC generator 1 and the rectifier circuit 2. On the other hand, the high-voltage control circuit 8 is disposed separately from the above-mentioned unit in view of the connections with the peripheral components such as the key switch 6, the onboard high-voltage electric load 5, etc., and is electrically connected to the voltage regulator 3A.

Next, description will turn to operations of the control apparatus according to the instant embodiment of the invention. When the common terminal C1 of the output change-over switch 71 is closed to the contact B1 in the battery charge operation mode (ordinary operation mode) for charging the battery 4, the plus terminal 201 of the rectifier circuit 2 is set to the charge-ready state. At this time point, the key switch 6 is in the off-state. Accordingly, the operation of the constant power supply source is inhibited. Thus, the output transistor 305 remains in the nonconducting state, whereby the exciting current supplied to the field coil 102 is interrupted.

When the key switch 6 is closed upon starting of the engine, the constant power supply source (801, 802) incorporated in the high-voltage control circuit 8 operates to generate a voltage across the resistor 807, which voltage is applied to the base of the output transistor 305 via the driving line L5. As result of this, the exciting current can flow through the field coil 102 of the AC generator 1 from the battery 4 by way of the output transistor 305.

As the engine operates, the field coil 102 rotates relative to the armature coil 101, as a result of which an AC voltage is induced in the armature coil 101. The induced AC voltage is rectified by the rectifier circuit 2. The DC voltage outputted from the rectifier circuit 2 makes appearance across the plus terminal 201 and the minus terminal 202 of the rectifier circuit 2. With this DC voltage, the battery 4 is charged by way of the rectifier output line L2 and the output change-over switch 71.

When the AC generator 1 continues to generate the electricity after operation of the engine has been started, there may occur an overcharge of the battery 4. Under the circumstances, the voltage of the plus terminal of the battery 4 is applied across the series circuit of the voltage divider resistors 301 and 302 via the excitation line L3. In that case, when the applied terminal voltage of the battery 4 increases beyond, for example, 14 volts, the divided voltage making appearance at the junction P1 between the voltage divider resistors 301 and 302 reaches a value at which the Zener diode 303 is turned on (i.e., set to the conducting state).

When the Zener diode 303 is turned on, the transistor 304 is switched to the conducting state, as a result of which the base potential of the output transistor 305 is lowered to the ground potential, resulting in that the output transistor 305 is turned off. Accordingly, the exciting current supplied to the field coil 102 from the battery 4 via the output transistor 305 is interrupted, as a result of which the potential at the plus terminal 201 of the rectifier circuit 2 becomes lowered with the terminal voltage of the battery 4 being restored to the predetermined constant level.

On the other hand, when the terminal voltage is lowered due to power supply to a load from the battery 4, the divided voltage appearing at the junction between the voltage divider resistors 301 and 302 lowers below the threshold voltage level of the Zener diode 303, which is then set to the off-state (nonconducting state), being accompanied with the turn-off of the transistor 304. A base voltage is applied to the base of the output transistor 305 from the constant power supply source, which results in that the exciting current again flows to the field coil 102 from the battery 4 via the output transistor 305 to thereby allow the AC generator 1 to restart the generation of electricity. The process of operations described above is repetitively executed every time the terminal voltage of the battery 4 lowers, for thereby regulating the terminal voltage of the battery 4 so that it assumes a constant level.

Next, description will turn to a high-voltage load operation mode in which a catalyst heating system or a defreezing system or the like high-voltage load is operated. At first, the output change-over switch 71 is changed over to thereby allow the output of the rectifier circuit 2 to be supplied to the onboard high-voltage electric load 5. At this time, the one-shot multivibrator 806a outputs a pulse signal having a temporal duration of about one second, which signal is applied to the base of the transistor 806b. Thus, the latter is set to the conducting state for about one second. As a result of this, the rectifier output line L2 is connected to the ground potential, which in turn means that the base of the output transistor 305 is connected to the ground potential with the output transistor 305 being turned off for about one second. Consequently, the exciting current flowing through the field coil 102 is attenuated. By virtue of this arrangement, the output change-over switch 71 is protected against damage due to spark which may otherwise be produced upon changing-over of the output change-over switch 71.

At this time, the terminal voltage appearing across the onboard high-voltage electric load 5 is applied to the plus terminal of the comparator 805 incorporated in the high-voltage control circuit 8 to be compared with the reference voltage applied to the minus terminal of the comparator 805.

When the terminal voltage mentioned above is lower than the reference voltage, the comparator 805 outputs a signal of low level, which is applied to the base of the transistor 806b to thereby turn off the latter. As a result of this, the voltage generated across the resistor 807 by the constant power supply source (801, 802) is applied to the base of the output transistor 305, which is then turned on to increase the exciting current flowing through the field coil 102. Thus, the output voltage of the AC generator 1 increases to thereby rise up the terminal voltage of the onboard high-voltage electric load 5.

However, when the terminal voltage of the onboard high-voltage electric load 5 increases beyond the reference voltage of the comparator 805, a high level voltage signal is outputted from the comparator 805 to be applied to the base of the transistor 806b, which responds thereto to be switched to the conducting state. When the transistor 806b turns on, the resistor 807 connected to the collector of the transistor 806b is coupled to the ground potential with application of the voltage to the base of the output transistor 305 being interrupted. Thus, the output transistor 305 is set to the nonconducting or off state.

When the output transistor 305 is turned off, the exciting current decreases, whereby the output voltage of the AC generator becomes lower. By carrying out repetitively the process or operation described above, the terminal voltage of the onboard high-voltage electric load 5 can be regulated to be constant at a predetermined value (reference voltage value).

At this juncture, it should be noted that the battery 4 is not discharged since it is disconnected from the output of the AC generator 1 and hence the terminal voltage of the battery 4 becomes lower. Consequently, the transistor 304 of the voltage regulator 3A is turned off to be invalidated with regards to the terminal voltage detecting function of the battery 4, whereby the transistor 304 is automatically changed over to the terminal voltage detecting function for the onboard high-voltage electric load 5.

As can be seen from the foregoing description, in the control apparatus according to the instant embodiment of the present invention, each of the plus polarity ends of the field coil 102 and the voltage divider resistor 301 is connected directly to the plus terminal of the battery 4 without intervention of the switch. Thus, the lowering of the output of the AC generator 1 in accompanying the lowering of the field current due to the contact voltage drop in the switch mentioned previously in conjunction of the conventional apparatus can successfully be avoided. Furthermore, the unwanted situation such as destruction of the battery 4 and/or the onboard high-voltage electric load 5 due to excessively large output of the AC generator 1 as brought about by variation in the regulating voltage can be evaded.

Embodiment 2

Figure 2:
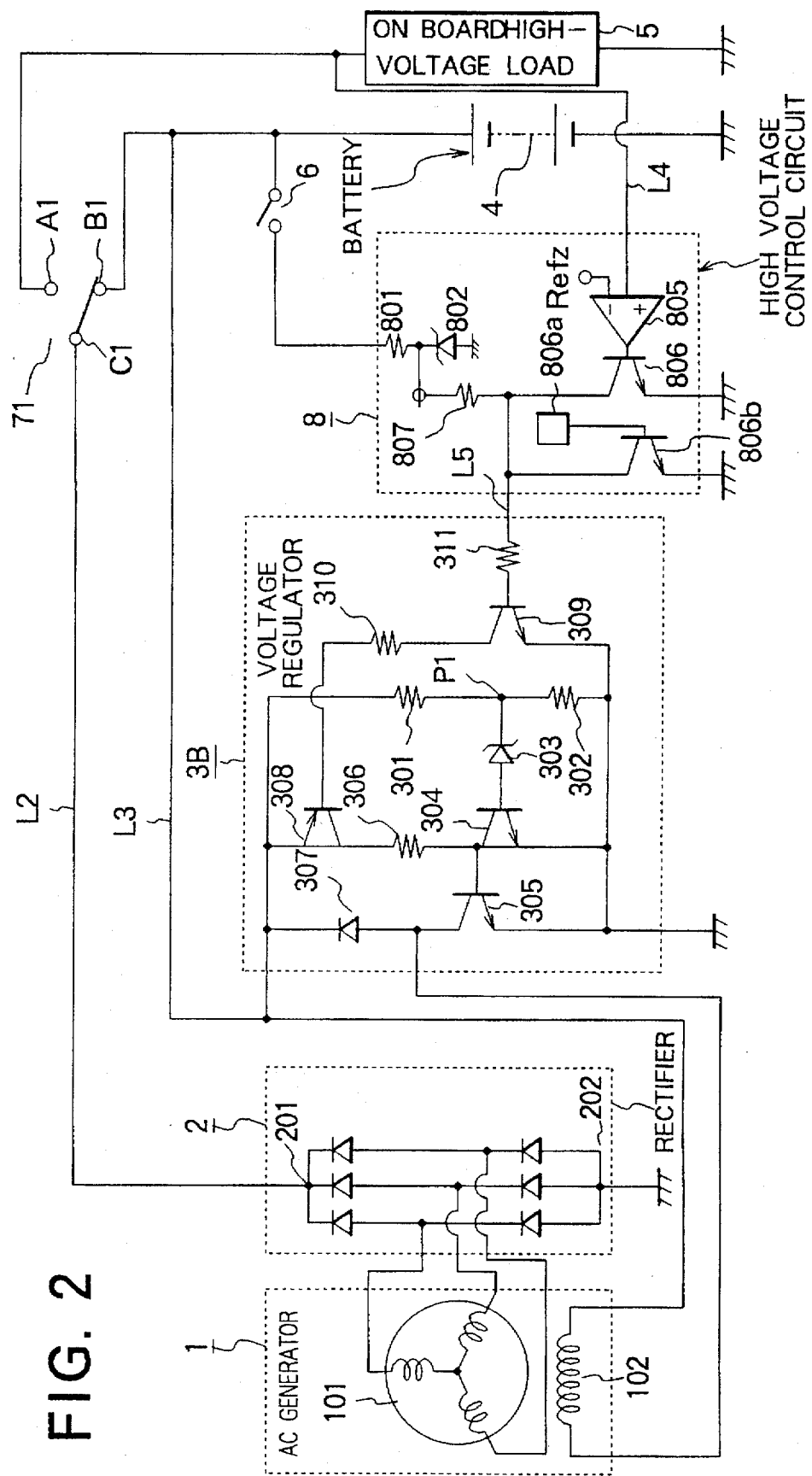
FIG. 2 is a block diagram showing a structure of the control apparatus for an AC generator of a motor vehicle according to a second embodiment of the present invention.

FIG. 2 shows a structure of the control apparatus for the AC generator of a motor vehicle according to a second embodiment of the present invention. In the figure, parts or components like as or equivalent to those described previously by reference to FIG. 1 are denoted by like reference characters, respectively. A voltage regulator 3B according to the instant embodiment of the invention includes a series circuit of a PNP-type transistor 308 and a base resistor 306 connected between the base of the transistor 305 and the plus terminal of the battery 4 via the excitation line L3.

Furthermore, a series circuit of a resistor 310 and a transistor 309 is inserted between the base of the transistor 308 and the ground potential, wherein the driving line L5 extending from the high voltage control circuit 8 is connected to the base of the transistor 309 by way of a resister 311.

Next, description will turn to operation of the control apparatus according to the instant embodiment of the invention. After the output change-over switch 71 has been closed to the contact B1 to thereby validate the battery charge operation mode, the key switch 6 is closed. Then, constant power supply source incorporated in the high-voltage control circuit 8 is put into operation, whereby a voltage is generated across the resistor 807. Due to this voltage, a base current flows to the transistor 309 of the voltage regulator 3B from the driving line L5 via the resistor 311. Thus, the transistor 309 is turned on.

In response to the switching of the transistor 309 to the on-state, the transistor 308 is turned on to apply a base voltage to the base of the output transistor 305 via the base resistor 306. As a result of this, an exciting current flows to the field coil 102 along a path extending from the plus terminal of the battery 4 through the field coil 102 and the output transistor 305 to the ground potential. As the field coil 102 rotates in accompanying the rotation of the engine, a voltage is induced in the armature coil 101 to be outputted to the plus terminal 201. After rectification of the output voltage of the AC generator, the DC voltage is fed to the battery 4 from the plus terminal 201 via the output line L2.

The charging voltage for the battery 4 is applied across both the ends of the series circuit of the voltage divider resistors 301 and 302 via the excitation line L3, wherein a divided voltage appearing as the junction P1 is applied to the cathode of the Zener diode 303. When the charging voltage increases to such a level that the divided voltage reaches a breakdown voltage of the Zener diode 303, the Zener diode 303 is switched to the conducting state, causing the transistor 304 to be turned on, whereby the base resistor 306 and hence the base of the output transistor 305 are connected to the ground with the output transistor 305 being turned off. Thus, the exciting current is interrupted. The operation mentioned so far is same as that of the control apparatus according to the first embodiment.

Now, it is supposed that the output change-over switch 71 is closed to the contact A1, whereby the output of the AC generator 1 is changed over from the battery 4 to the onboard high-voltage electric load 5 to thereby validate the high-voltage load operation mode, the one-shot multivibrator 806a generates a pulse signal having a duration of about 1 second which is applied to the base of the transistor 806b. As a result of this, the transistor 806b is set to the on-state about one second to thereby attenuate the exciting current flowing to the field coil 102.

After lapse of about one second, the transistors 309 and 308 and the output transistor 305 are again turned on, allowing the exciting current to flow through the output transistor 305. Initially, the terminal voltage of the onboard high-voltage electric load 5 is lower than the reference voltage inputted to the comparator 805. Consequently, the voltage generated across the resistor 807 due to the turn-off the transistor 806 causes the transistor 309 to be turned on, whereby the operation similar to that in the battery charge operation mode is effectuated.

When the terminal voltage of the onboard high-voltage electric load 5 increases beyond the reference voltage applied to the comparator 805 as the output voltage of the AC generator 1 increases, the transistor 806 is turned on to thereby connect the resistor 807 to the ground potential. As a result of this, the transistors 309 and 308 and the transistor 309 of the voltage regulator 3B are set to the off-state to interrupt the exciting current, whereby the terminal voltage of the onboard high-voltage electric load 5 is so regulated as to assume a predetermined constant value. However, when the terminal voltage of the onboard high-voltage electric load 5 becomes lower than the reference voltage, the transistors 309 and 308 and the output transistor 305 are again turned on to supply the exciting current for increasing the output voltage of the AC generator 1.

Embodiment 3

Figure 3:
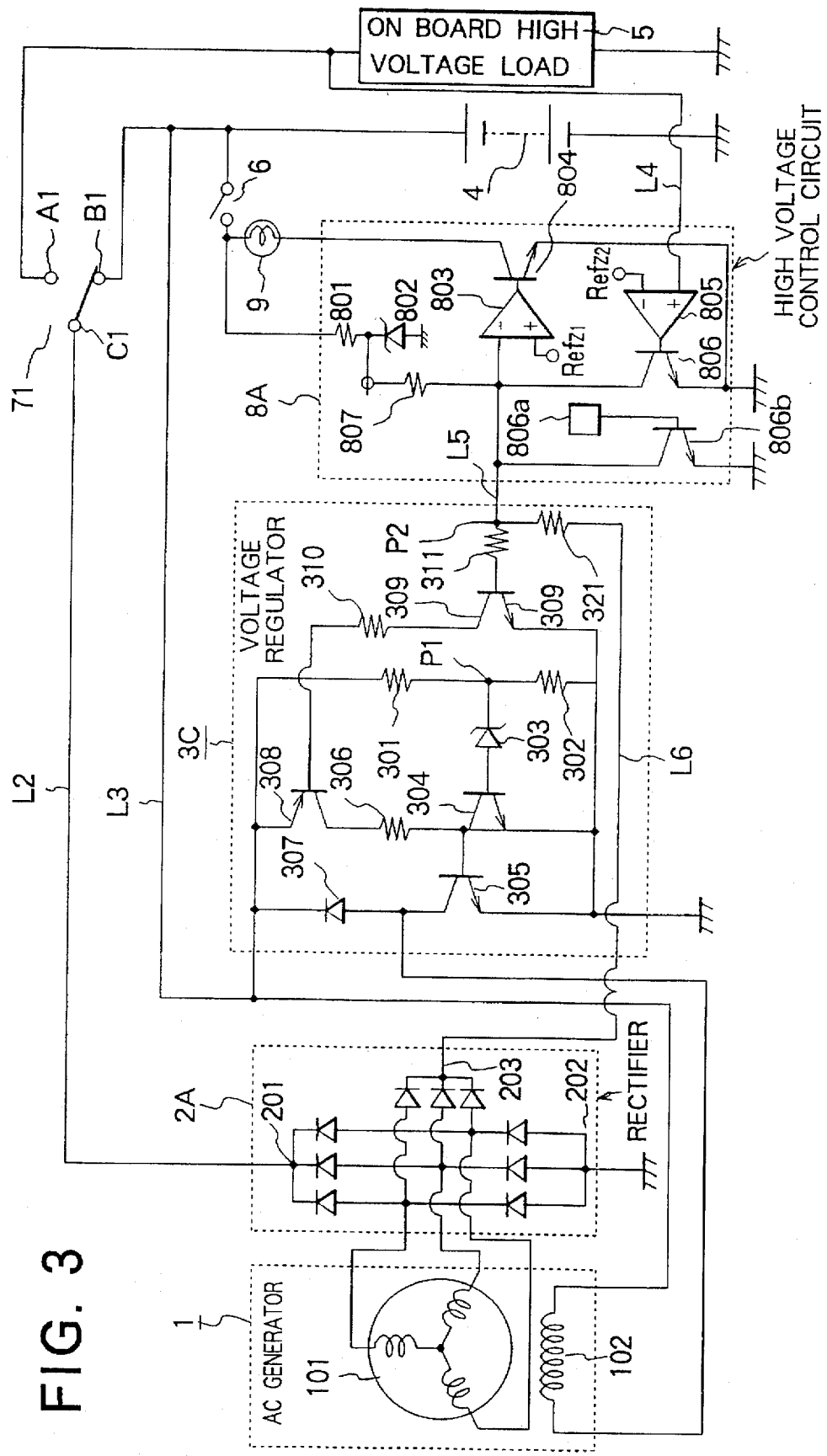
FIG. 3 is a block diagram showing a structure of the control apparatus for an AC generator of a motor vehicle according to a third embodiment of the invention.

The instant embodiment of the invention is directed to the control apparatus for the AC generator of a motor vehicle which is equipped with a high voltage control circuit imparted with a function for detecting abnormality of the AG generator to thereby generate an alarm. FIG. 3 is a block diagram showing a structure of the control apparatus for the AC generator of a motor vehicle according to the instant embodiment of the invention. In FIG. 3, like reference characters as those used in FIG. 2 designate the parts or components same as or equivalent to those described hereinbefore by referring to FIG. 2. As can be seen in FIG. 3, a rectifier circuit 2A is provided with a second rectified current output terminal 203 for detecting an abnormality of the output voltage of the AC generator. The second rectified current output terminal 203 is isolated completely from the terminal of the battery 4. Consequently, even in the battery charge operation mode, the second rectified current output terminal 203 is prevented from the influence of the terminal voltage of the battery 4.

A voltage regulator 3C according to the instant embodiment of the present invention differs from the voltage regulator 3B described previously in conjunction with the second embodiment in that an abnormality detection line L6 is led from the second rectified current output terminal 203 and connected to the junction P2 of the driving line L5 by way of a resistor 321. Normally, there makes appearance at the junction P2 a voltage of a value corresponding to a value of the voltage generated across the resistor 807 divided by a resistance ratio between the resistors 311 and 321 plus an output voltage appearing at the second rectified current output terminal 203 and divided by a resistance ratio between the resistors 311 and 321.

A high-voltage control circuit 8A according to the instant embodiment of the invention differs from the structure of the high-voltage control circuit 8 according to the first and second embodiments in that a comparator 803 for detecting an abnormality of the output voltage of the AC generator, a transistor 804 which is turned on in response to a high level signal of the comparator 803, and an electric generation indicating lamp 9 which is lit when the transistor 804 is turned on are additionally provided.

The comparator 803 has a plus input terminal to which a reference voltage serving as a decision reference for determining an abnormal lowering of the output voltage of the AC generator 1. The minus input terminal of the comparator 803 is applied with a divided voltage from the junction P2 via the driving line L5. On the other hand, the transistor 804 has a base connected to the output terminal of the comparator 803, a collector connected to the key switch 6 by way of the electric generation indicating lamp 9 and an emitter connected to the ground.

Next, description will be directed to operations of the control apparatus according to the instant embodiment of the invention with emphasis being put on the operation for detecting the abnormality of the output voltage of the AC generator. The output voltage of the AC generator 1 appearing at the second rectified current output terminal 203 after rectification is inputted to the voltage regulator 3C via the abnormality detection line L6 and divided by the ratio between the resistance values of the resistors 311 and 321 to be outputted as the rectifier output voltage which makes appearance at the junction P2.

The rectified output voltage mentioned above is inputted to the minus input terminal of the comparator 803 via the driving line L5 to be compared with the reference voltage applied to the plus input terminal of the comparator 803. In that case, when the AC generator 1 operates normally with the value of the rectifier output voltage inputted to the minus input terminal of the comparator 803 being higher than the reference voltage applied to the plus input terminal thereof, the output signal of the comparator 803 assumes a low level. This signal is applied to the base of the transistor 804. Consequently, the transistor 804 is maintained in the off-state. Thus, the electric generation indicating lamp 9 remains unlit.

However, when the output voltage of the AC generator 1 becomes abnormally low for some reason to thereby lower the voltage appearing at the junction P2 than the reference voltage applied to the comparator 803, a high-level signal is outputted therefrom to be applied to the base of the transistor 804 which is then turned on. As a consequence, a current flows through the electric generation indicating lamp 9 and the transistor 804 to the ground, whereby the electric generation indicating lamp 9 is lit, alarming the driver of occurrence of abnormality in the AC generator. Parenthetically, operation of the voltage regulator and that of the high-voltage control circuit in the battery charge operation mode and the high-voltage operation mode are same as those of the control apparatus described hereinbefore in conjunction with the second embodiment.

Embodiment 4

In the case of the third embodiment, the abnormality diagnosis of the AC generator is performed on the basis of the output of the rectifier. However, such abnormality decision may be made on the basis of a voltage derived directly from one phase of the AC generator.

Figure 4:
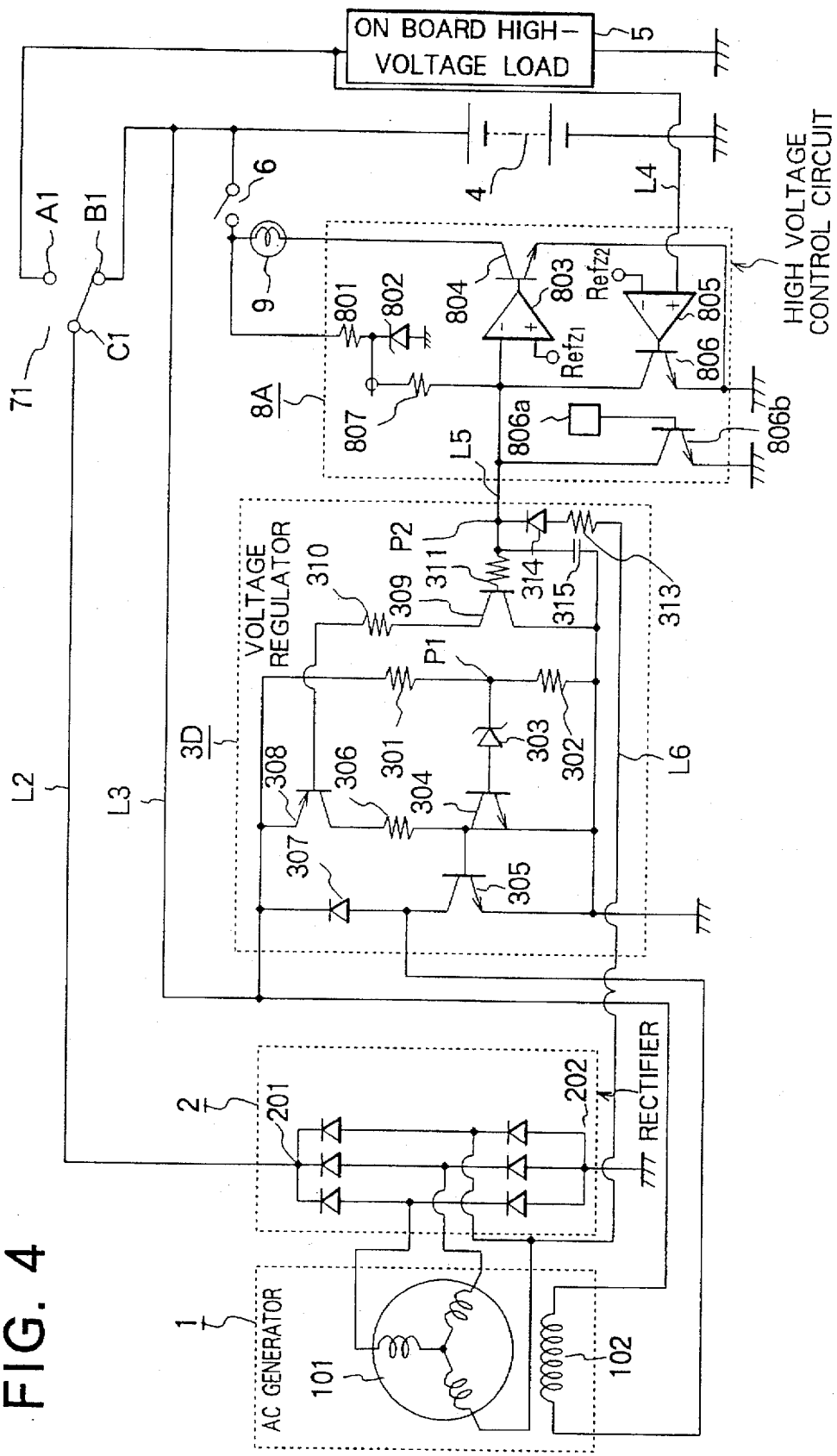
FIG. 4 is a circuit diagram showing a structure of the control apparatus for an AC generator of a motor vehicle according to a fourth embodiment of the invention.

FIG. 4 is a circuit diagram showing a structure of the control apparatus for an AC generator of a motor vehicle according to a fourth embodiment of the invention. In this figure, like reference characters as those used in FIGS. 2 and 3 denote like or equivalent parts. A voltage regulator 3D differs from the voltage regulator 3B shown in FIG. 2 in that an abnormality detection line L6 is additionally provided branched from one phase output winding of the armature coil 101 of the AC generator 1.

The abnormality detection line L6 as led out is connected a series circuit of a resistor 313 and a diode 314, wherein the cathode of the diode 314 is connected to the driving line L5. Furthermore, a smoothing capacitor 315 is provided between the driving line L5 and the ground potential.

Next, operation of the control apparatus according to the instant embodiment of the invention will be described with emphasis being put on the operation for detecting abnormality of the output voltage of the AC generator 1. One of the three phase voltages of the AC generator 1 induced in the armature coil 101 during operation of the AC generator 1 is inputted to the voltage regulator 3D via the abnormality detection line L6 in the form of a rectangular voltage having a duty ratio of 50%. For rectifying the AC generator output voltage inputted to the voltage regulator 3D, there is provided a rectifying/smoothing circuitry which is constituted by the resistor 313, the diode 314 and the smoothing capacitor 315. Thus, the rectified output voltage of the AC generator 1 makes appearance at the junction P2.

When the output voltage of the AC generator 1 derived through the resistor 313 lowers to zero level, the electric charge stored in the smoothing capacitor 315 tends to be discharged. However, such discharge is prevented by the diode 314.

The output voltage of the AC generator 1 mentioned above is inputted to the minus input terminal of the comparator 803 via the driving line L5 to be compared with the reference voltage applied to the plus input terminal of the comparator 803. In that case, when the AC generator 1 operates normally with the output voltage of the AC generator 1 being higher than the reference voltage, the output signal of the comparator 803 assumes a low level. This signal is applied to the base of the transistor 804. Consequently, the transistor 804 is maintained in the off-state. Thus, the electric generation indicating lamp 9 remains unlit.

However, when the output voltage of the AC generator 1 becomes abnormally low for some reason and when the AC voltage 1 appearing at the junction P2 becomes lower than the reference voltage applied to the comparator 803, a high-level signal is outputted therefrom to be applied to the base of the transistor 804 which is then turned on. As a consequence, a current flows through the electric generation indicating lamp 9 and the transistor 804 to the ground, whereby the electric generation indicating lamp 9 is lit, alarming the driver of occurrence of abnormality in the AC generator. Parenthetically, operation of the voltage regulator and that of the high-voltage control circuit in the battery charge operation mode and the high-voltage operation mode are same as those of the control apparatus described hereinbefore in conjunction with the second and third embodiments.

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although the detection of abnormality of the AC generator is alarmed by using a lamp, any other suitable alarm device such as a buzzer or the like may be employed.

Accordingly, all suitable modifications and equivalents may be resorted to, falling within the spirit and scope of the invention.

What is claimed is:

1. A control apparatus for an AC generator of a motor vehicle, comprising:

a rectifier circuit for rectifying an output of said AC generator including a field coil;

output change-over means for changing over said output of said rectifier circuit to one of a battery and a high-voltage load mounted on said motor vehicle;

voltage regulating means for regulating an exciting current supplied to said field coil in dependence on a terminal voltage of said battery as detected on a charging line connected to said battery by way of said output change-over means upon charging of said battery from the output of said rectifier circuit, to thereby regulate the output voltage of said AC generator; and means for preventing damage to contacts of the change-over means when switching from the battery to the high-voltage load, said damage prevention means comprising:

high-voltage control means including time delay means for interrupting the exciting current flowing through the field coil for a brief, predetermined time interval during change-over to said high-voltage load.

2. A control apparatus for an AC generator of a motor vehicle, comprising:

a rectifier circuit for rectifying an output of said AC generator including a field coil;

output change-over means for changing over said output of said rectifier circuit to one of a battery and a high-voltage load mounted on said motor vehicle;

voltage regulating means for regulating an exciting current supplied to said field coil in dependence on a terminal voltage of said battery as detected on a charging line connected to said battery by way of said output change-over means upon charging of said battery from the output of said rectifier circuit, to thereby regulate the output voltage of said AC generator; and high-voltage control means for detecting a terminal voltage of a said high-voltage load upon switching of said output change-over means to said high-voltage load to thereby output a drive signal for controlling operation of said voltage regulating means upon detecting one of said terminal voltage of said high-voltage load below a first reference voltage and said terminal voltage of said high-voltage load above a second reference voltage, wherein said detection constitutes an abnormality detection.

3. A control apparatus for an AC generator of a motor vehicle according to claim 2, wherein said high-voltage control means interrupts the detecting operation of said voltage regulator for detecting the terminal voltage of said battery upon switching of said output change-over means to said high-voltage load and outputs a drive signal for driving/controlling said voltage regulating means in dependence on the result of abnormality detection of the terminal voltage of said abnormality high-voltage load.

4. A control apparatus for an AC generator of a motor vehicle according to claim 2, wherein said high-voltage control means includes exciting current interrupting means for interrupting temporarily the supply of said exciting current to said field coil from said voltage regulator when said output change-over means are switched to said high-voltage load.

5. A control apparatus for an AC generator of a motor vehicle according to claim 2, wherein said high-voltage control means includes alarming means for outputting an alarm signal in response to an abnormality detection signal indicating that the output of said AC generator is below a generator reference level.

6. A control apparatus for an AC generator of a motor vehicle according to claim 5, wherein said abnormality detection signal is derived from an output voltage of said AC generator rectified by a rectifier circuit and outputted from an additional rectifier output terminal thereof.

7. A control apparatus for an AC generator of a motor vehicle according to claim 5, wherein said abnormality detection signal is derived from a smoothed voltage generated by rectifying and smoothing one phase output voltage of said AC generator.

8. A control apparatus for an AC generator of a motor vehicle according to claim 6, wherein said abnormality detection signal is applied to an input terminal of the voltage regulator to which a drive signal is inputted through a connecting line extending from said high-voltage control means and at the same time applied to alarming means by way of said connecting line.

* * * * *